(12) United States Patent
Ivenz et al.

(10) Patent No.: US 9,321,427 B2
(45) Date of Patent: Apr. 26, 2016

(54) SAFETY DEVICE FOR A MOTOR VEHICLE

(71) Applicant: Bayerische Motoren Werke Aktiengesellschaft, Munich (DE)

(72) Inventors: Udo Ivenz, Gablingen (DE); Markus Springsklee, Munich (DE); Ulrich Koestler, Herbertshausen (DE); Tim Rudolph, Munich (DE); Walter Meierhofer, Schmidham (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/635,267

(22) Filed: Mar. 2, 2015

(65) Prior Publication Data

US 2015/0175122 A1 Jun. 25, 2015

Related U.S. Application Data

(63) Continuation of application No. PCT/EP2013/067235, filed on Aug. 19, 2013.

(30) Foreign Application Priority Data

Sep. 3, 2012 (DE) .......................... 10 2012 215 579
Mar. 26, 2013 (DE) .......................... 10 2013 205 283

(51) Int. Cl.
*B60R 21/36* (2011.01)
*B60R 21/233* (2006.01)
(Continued)

(52) U.S. Cl.
CPC ......... *B60R 21/36* (2013.01); *B60R 2021/2395* (2013.01); *B60R 2021/23324* (2013.01); *B60R 2021/346* (2013.01)

(58) Field of Classification Search
CPC .............. B60R 21/36; B60R 2021/346; B60R 2021/23324; B60R 2021/2395
See application file for complete search history.

(56) References Cited

U.S. PATENT DOCUMENTS

| 9,016,721 B1 * | 4/2015 | Potter | ................... B60R 21/239 280/739 |
| 2005/0206137 A1 * | 9/2005 | Takimoto | .............. B60R 21/233 280/729 |

(Continued)

FOREIGN PATENT DOCUMENTS

| DE | 102 54 589 A1 | 6/2003 |
| DE | 10 2006 033 670 A1 | 3/2007 |
| EP | 1 681 212 A2 | 7/2006 |

OTHER PUBLICATIONS

International Search Report (PCT/ISA/210) dated Oct. 17, 2013, with English translation (Four (4) pages).

(Continued)

*Primary Examiner* — Drew Brown
(74) *Attorney, Agent, or Firm* — Crowell & Moring LLP

(57) ABSTRACT

A safety device for a motor vehicle includes an inflatable airbag which is adjusted so as to extend across at least a bottom portion of an outer side of a windshield of the motor vehicle in an inflated state in order to protect a person impacting the motor vehicle. The safety device has a gas generator for inflating the airbag. The airbag has a first compartment and a second compartment. The first compartment and the second compartment are disposed such that at a specific vehicle speed or within a specific vehicle speed range, a shorter person would very likely hit the first compartment, while at the specific vehicle speed or within the specific vehicle speed range, a taller person would very likely hit the second compartment.

20 Claims, 2 Drawing Sheets

(51) Int. Cl.
*B60R 21/239* (2006.01)
*B60R 21/34* (2011.01)

(56) References Cited

U.S. PATENT DOCUMENTS

| | | | |
|---|---|---|---|
| 2007/0023223 A1 | 2/2007 | Okamoto et al. | |
| 2010/0230944 A1* | 9/2010 | Narita | B60R 21/36 280/741 |
| 2011/0057427 A1* | 3/2011 | Cho | B60R 21/239 280/736 |
| 2014/0027195 A1* | 1/2014 | Kalliske | B60R 21/36 180/271 |
| 2014/0318881 A1* | 10/2014 | Sugimoto | B60R 21/237 180/274 |
| 2015/0144413 A1* | 5/2015 | Jeong | B60R 21/2346 180/274 |

OTHER PUBLICATIONS

German Search Report dated Apr. 29, 2013, with English translation (Ten (10) pages).

* cited by examiner

SAFETY DEVICE FOR A MOTOR VEHICLE

CROSS REFERENCE TO RELATED APPLICATIONS

This application is a continuation of PCT International Application No. PCT/EP2013/067235, filed Aug. 19, 2013, which claims priority under 35 U.S.C. §119 from German Patent Application No. 10 2012 215 579.1, filed Sep. 3, 2012 and German Patent Application No. 10 2013 205 283.9, filed Mar. 26, 2013, the entire disclosures of which are herein expressly incorporated by reference.

BACKGROUND AND SUMMARY OF THE INVENTION

The present invention relates to a safety device for a motor vehicle having an inflatable airbag adapted in such a way that it extends, in an inflated condition, over at least a bottom portion of an outer side of a windshield of the motor vehicle in order to protect a person that collides with the motor vehicle.

A known windshield airbag device for a motor vehicle is designed in such a way that in the case of a collision or an imminent collision with a pedestrian, a front cover is lifted, at least at the rear end thereof, and a pedestrian protection airbag provided under the front cover is inflated. In particular, the windshield airbag is inflated upon lifting of the front cover by way of a gas generator, so that the windshield airbag unfolds out of a gap between the front cover and a cowl and subsequently extends, in the fully inflated condition, over the entire width of the windshield and over the left-hand and right-hand A pillars of the vehicle.

It is the object of the present invention to provide a safety device for a motor vehicle having an inflatable airbag that is adapted in such a way that it extends, in its inflated condition, over an outer side of a vehicle body for protecting a colliding person, wherein the safety device can initiate an inflation of the airbag at a time that is as late as possible.

This and other objects are achieved according to the present invention by a safety device for a motor vehicle having an inflatable airbag that is adapted in such a way that it extends, in its inflated condition, over at least a bottom portion of an outer side of a windshield of the motor vehicle and, in particular, additionally over a left-hand A pillar and a right-hand A pillar of the motor vehicle, in order to protect a colliding person, in particular a pedestrian or a cyclist. Further, the safety device has a gas generator for inflating the airbag. The airbag according to the present invention has a first compartment and a second compartment. The first compartment is provided here, in the inflated condition of the airbag, adjacent to a bottom end of the windshield, i.e. in particular adjacent to a rear end of a front cover or a cowl. The second compartment is provided, in the inflated condition, remote from the bottom end of the windshield, i.e. in particular remote from the rear end of the front cover or the cowl. In particular, the second compartment may be formed adjacent to the first compartment. Further, the first compartment and the second compartment extend over the entire width of the windshield. During the inflation of the airbag, the first compartment can be completely filled at an earlier point-in-time than the second compartment.

As a result of the arrangement of the first compartment and the second compartment according to the invention, a comparatively short person will, in the case of a frontal collision with the motor vehicle, be more likely to hit the first compartment. Of course, this is also a function of the vehicle speed. The first compartment in the arrangement according to the invention on the motor vehicle is located further towards the front and further down in a main driving direction of the motor vehicle, if it is assumed that a windshield extends obliquely upwards and backwards.

A comparatively tall person, however, will be more likely to hit the second compartment that is provided further back and further up in the main driving direction of the motor vehicle. In this case it has to be assumed that the impact of the tall person would, on account of the fact that the point of impact is higher, occur at a later point-in-time. This applies in particular to a frontal collision of the motor vehicle with a person, wherein the person will be struck by a front bumper of the motor vehicle and can then hit the windshield via the front cover. By inflating the first compartment sooner, the earlier impact of a short person can be taken into account, and the second compartment is inflated later, so that a taller person would hit the second compartment at a later point-in-time or at a later time interval. Altogether, an inflation of the airbag, i.e. an activation of a gas generator, can commence at a later point-in-time, since there is no need for the whole airbag to be inflated at the earlier point-in-time or during an earlier time interval, but just the first compartment. A later activation of the gas generator brings about the advantage that more time remains for preparing the triggering of the airbag. This is advantageous in particular in the case of a required lifting of the front cover, since the lifting of the front cover takes time. Further, more time for detecting the collision situation is available to a control unit, so that a more specific response to the collision situation can be made possible or the prevention of a false triggering or safety triggering of the airbag, i.e. triggering even though actually no collision with a person is taking place or has taken place, can be improved.

As a result of the specific arrangement of the first compartment and the second compartment and the different collision behaviors of people of different sizes, for example a short person and a tall person, in the case of a collision, the first compartment may be designed in particular for the impact of a shorter person and the second compartment may be designed in particular for the impact of a taller person.

According to a second aspect of the present invention, the above object is achieved by means of a safety device for a motor vehicle with an inflatable airbag that is adapted in such a way that it extends, in an inflated condition, over at least a bottom portion of an outer side of a windshield of the motor vehicle for protecting a colliding person. Further, the safety device has a gas generator for inflating the airbag, and the airbag has a first compartment and a second compartment. The first compartment and the second compartment are arranged in such a way that a short person, i.e. a comparatively shorter person, would be very likely to hit, at a certain vehicle speed or within a certain vehicle speed range, the first compartment, and a tall person, i.e. a comparatively taller person, would be very likely to hit, at a certain vehicle speed or within the certain vehicle speed range, the second compartment.

The features of the second aspect of the present invention are, as was explained above in relation to the first aspect, based on the consideration that in the case of a frontal collision with the motor vehicle, a shorter person will behave differently than a taller person. In particular, the inventors have found that in the case of a frontal collision, a short person flies less high and less far, whereas a taller person flies higher and further. In particular, it could be determined by way of models that a short person is very likely to hit a lower region of the windshield at a first point-in-time or during a first time interval, whereas a tall person will land on the windshield further up and further back at a second point-in-time or during a second time interval. This is also as a result of an angled positioning of the windshield in almost all passenger vehicles having a front cover. The first point-in-time or the first time interval would be earlier than the second point-in-time or earlier than the second time interval. Thus, it would also make sense to completely fill the first compartment and the second compartment at correspondingly different times, because the effectivity of an airbag is greatest if the respective compartment is already completely filled at the time it is hit by a person of the respective size. At the moment of the respective impact, the respective compartment should be at optimal pressure. The time of impact of the respective person is additionally influenced by the vehicle speed. Accordingly, according to the present invention, the first compartment may advantageously be designed with a view to protecting a short person and the second compartment may advantageously be designed with a view to protecting a tall person.

The safety device according to the two aspects of the invention as described above may, in particular, be designed such that a fluid connection is formed between the first compartment and the second compartment, i.e. a connection through which the gas can flow.

The safety device according to the two aspects of the invention as described above with the fluid connection may here, in particular, be designed such that the first compartment is completely filled at an expected first point-in-time or an expected first time interval, at which a short person would hit the airbag, and the second compartment is completely filled via the fluid connection at an expected later, second point-in-time or an expected later, second time interval, at which a tall person would hit the airbag.

According to a preferred development of the safety device according to the aspects of the present invention, the latter is designed such that in the case of a collision with a shorter person, any gas present in the first compartment at the point of impact of the short person onto the first compartment can escape via the fluid connection into the second compartment.

An escape of gas upon impact of a person onto the windshield airbag is necessary in order to prevent a so-called rebound effect on the person. According to the present invention, the gas present in the completely inflated first compartment is not discharged into the environment, but the fluid connection is used as a gas outlet valve of the first compartment and the gas present in the first compartment can escape into the second compartment. This means that at the early point of time of impact of the person onto the first compartment there is no need to control a gas outlet valve for discharging gas into the environment.

According to a preferred development of the safety device according to the present invention, the latter may be designed such that in the case of a collision with a tall person, any gas present in the second compartment at the point of impact of the tall person onto the second compartment can escape into the first compartment via the fluid connection and any gas from the first compartment can escape into the environment.

In this way, the fluid connection becomes a gas outlet of the first compartment and the gas can then be discharged via the first compartment into the environment. In this way, a rebound effect is avoided even in the case of a tall person colliding with the second compartment.

According to the features described above, the airbag is therefore suitably adapted to the impact of a short person as well as to the impact of a tall person onto the airbag.

According to a preferred development of the present invention, the first compartment in the safety device is, in the inflated condition, formed to be directly adjacent to the windshield. In the same way, the second compartment may be designed, in the inflated condition, to be directly adjacent to the windshield. The expression "directly adjacent to the windshield" means that the compartment rests—or at least comes to rest—against the windshield, when a person collides with the respective compartment.

According to a preferred development of the safety device according to the present invention, the gas generator is only connected to the first compartment and is designed in such a way that, during the inflation of the airbag, it blows gas directly into the first compartment. In other words, the gas generator is preferably not connected to the second compartment but merely to the first, and blows the gas directly into the first compartment, and the second compartment can be filled indirectly via the first compartment.

In the safety device according to the present invention, the first compartment and the second compartment are preferably separated from each other by a partition.

As a result, a particularly simple design of the airbag with two compartments becomes possible, which as a result may be directly adjacent to each other, without an interspace being formed between the first compartment and the second compartment.

Preferably, the first compartment and the second compartment are separated from each other by a single partition, which further simplifies the design and the production of the airbag.

In the safety device according to the invention having the partition and the fluid connection, the fluid connection is preferably formed in an edge region between the partition and an outer airbag wall, i.e. an airbag sleeve. Advantageously here, the fluid connection is provided in a left-hand edge region and/or a right-hand edge region of the partition or the airbag.

As a result, a rapid deployment of the airbag via the first compartment is favored. In particular, this favors an inflation of the first compartment as wide as possible, before gas enters into the second compartment via the fluid connection. As a result, especially the circumstance that a short person hits the first compartment at an earlier point-in-time, whereas a tall person hits the second compartment at a later point-in-time may be taken into account.

Further, in the case of the safety device according to the present invention, the first compartment preferably extends over the entire width of the windshield and in the same way the second compartment extends over the entire width of the windshield. In addition, the first compartment and/or the second compartment may each extend over a left-hand and a right-hand A pillar.

According to a further preferred development of the safety device according to the present invention, the first compartment has a first gas outlet for discharging gas from the inflated airbag into the environment, wherein, in particular, a first controllable gas outlet valve is provided in the first gas outlet.

As a result, a rebound effect in the case of an impact of a person on the airbag may be reduced by discharging gas from the airbag into the environment.

It is further possible for the first compartment to have a second gas outlet for discharging gas from the inflated airbag into the environment, wherein advantageously a second controllable gas outlet valve is provided in the second gas outlet. In this way, different gas outlet scenarios may be realized depending on requirements.

In case a first gas outlet valve and a second gas outlet valve are provided, the second gas outlet valve is preferably larger than the first gas outlet valve. In other words, a larger amount of gas can preferably flow through the second gas outlet valve than through the first gas outlet valve. As a result, it is particularly simple to provide a desired gas outlet amount depending on the situation.

In the safety device according to the invention having a first gas outlet valve and a second gas outlet valve, the first gas outlet valve is preferably opened first and, subsequently, the second gas outlet valve is opened. In particular, the second gas outlet valve may in this case be dimensioned and controlled in such a way that the airbag can be completely emptied at a point-in-time at which a protective effect of the airbag is no longer needed. This is of advantage where the airbag is supposed to be moved out of the field of view of a driver of the vehicle by way of a return unit. In this way, the small first gas outlet valve serves to reduce a rebound effect, whereas the larger, second gas outlet valve is designed for the purpose of completely emptying the airbag as fast as possible.

Alternatively, the first gas outlet valve and the second gas outlet valve may be opened at the same time.

According to a preferred embodiment, the first gas outlet valve and the second gas outlet valve may have the same size and may be connected in particular symmetrically in a left-hand region or a right-hand region of the first compartment. In the case of a simultaneous opening of the first gas outlet valve and the second gas outlet valve, a uniform, symmetrical emptying of the first compartment or of the second compartment via the first compartment can thus be carried out.

In the safety device according to the present invention having a controllable gas outlet valve, the safety device is, in particular, designed such that at least the first controllable gas outlet valve is opened at a point-in-time at which the impact of a tall person on the second compartment is expected.

In this way, in the case of an impact of a tall person and in the case of a completely inflated airbag, i.e. a completely filled first compartment and a completely filled second compartment, the rebound effect can be better avoided.

In the safety device according to the present invention, the second compartment can preferably be emptied exclusively via the fluid connection. In other words, the fluid connection is the only gas outlet of the second compartment. However, this is not meant to exclude the possibility that minor amounts of gas can still escape from the second compartment via seams or other leaks in the airbag at other places. Alternatively or in addition, the second compartment can be filled with gas exclusively via the fluid connection. Thus, the second compartment is filled only via the first compartment, as a result of which it is ensured in a simple manner that the second compartment is completely filled at a later point-in-time than the first compartment.

According to a further preferred development of the safety device, a maximum volume of the first compartment is greater than a maximum volume of the second compartment.

This is particularly advantageous in that in the case of too small a volume of the first compartment, into which the gas is directly blown by the gas generator, an excessively high pressure might occur, which would place the first compartment under excessive stress.

In particular, a ratio between the maximum volume of the first compartment and the maximum volume of the second compartment may be in a range of 65:35 to 85:15. Preferably, the range may extend from 70:30 to 80:20.

The present invention allows taking into account, with a simple design, the different collision behaviors of people of different sizes. It has been discovered that the above two-compartment system is sufficient in order to account for many different sizes of people.

However, according to a further development of the invention it is also possible for the airbag to include a third compartment that is adjacent to the second compartment and is in communication with the second compartment via a fluid connection and a partition. In this respect, the third compartment may also extend over the entire width of the windshield. Further, the third compartment may be designed so that it can be emptied only via the second compartment. In this way, the airbag is formed with three zones, which allows an even better adaptation to collisions with people of different sizes.

Other objects, advantages and novel features of the present invention will become apparent from the following detailed description of one or more preferred embodiments when considered in conjunction with the accompanying drawings.

DETAILED DESCRIPTION OF THE DRAWINGS

An embodiment example will be explained below with reference to FIGS. 1 to 3.

Figure 1:
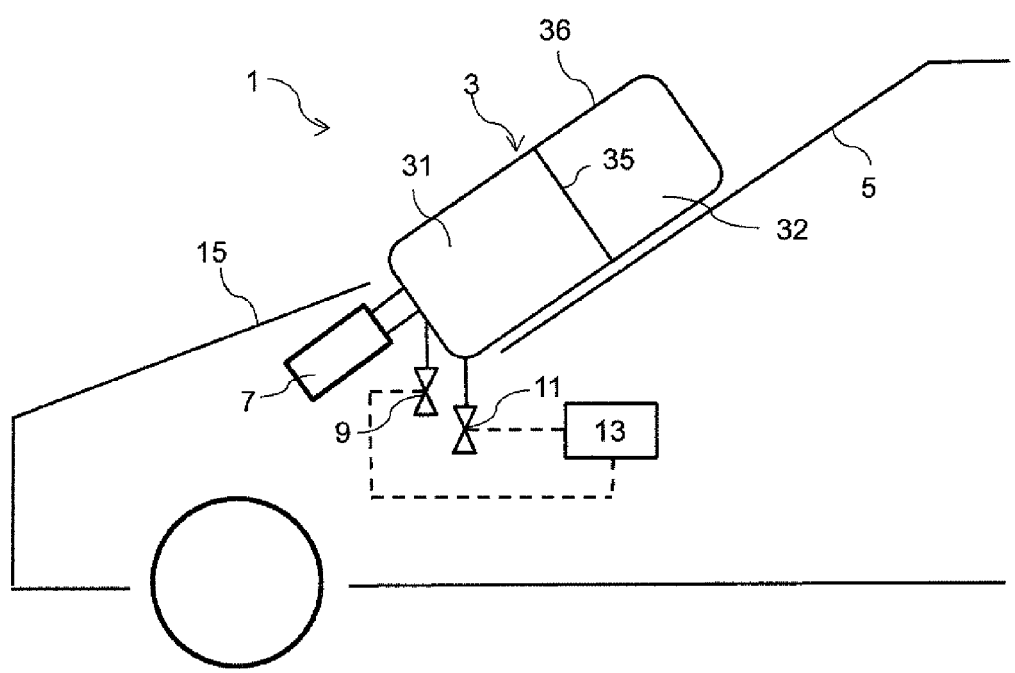
FIG. 1 is a schematic lateral view of a windshield airbag on a motor vehicle according to an embodiment of the present invention.

FIG. 1 shows a schematic view of a safety device 1 on a motor vehicle. The safety device 1 has a windshield airbag 3 that extends, in the inflated condition shown, over a bottom portion of a windshield 5 of the motor vehicle. The airbag 3 was inflated using a gas generator 7. The windshield airbag 3 has a first compartment 31 and a second compartment 32, which compartments are separated from each other by a partition 35. The first compartment 31 is formed to be substantially parallel to the windshield 5 and is adjacent to a bottom end of the windshield 5. The second compartment 32 is also formed to be parallel to the windshield 5 and is located, in the inflated condition, in a position remote from the bottom end of the windshield. The second compartment 32 is located directly adjacent, separated by the partition 35, to the first compartment 31. An outer airbag wall or an airbag sleeve with reference numeral 36 is provided. The gas generator 7 is located below a rear end of a front cover 15. In the condition shown, the front cover 15 is lifted, so that the windshield airbag 3 can be deployed out of a gap between the front cover 15 and the windshield 5 or a cowl. The windshield airbag 3 extends over the entire width of the windshield 5 beyond the left-hand and the right-hand A pillars. Accordingly, also the first compartment 31 and the second compartment 32 extend over the entire width of the windshield 5 beyond the left-hand and the right-hand A pillar. FIG. 1 further shows a first controllable gas outlet valve 9 and a second controllable gas outlet valve 11, which are connected to the first compartment 31 and are controlled via a control unit 13.

Figure 3:
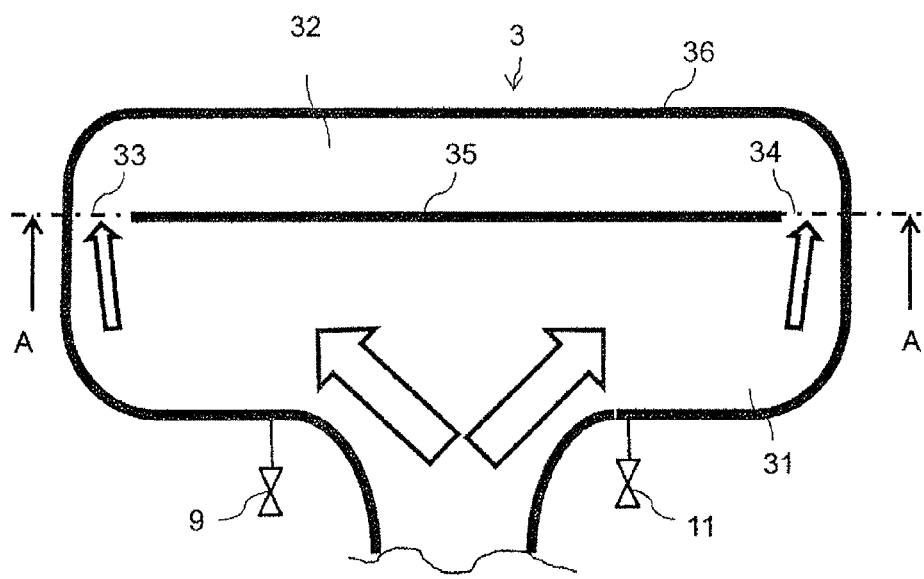
FIG. 3 is a schematic, sectioned top view of the windshield airbag parallel to the windshield according to the embodiment of the present invention.

FIG. 3 shows a schematic, sectioned top view of the windshield airbag 3 parallel to the windshield 5 (which windshield is not shown in FIG. 3). In particular, FIG. 3 also shows the first compartment 31 and the second compartment 32, with the first compartment 31 being larger than the second compartment 32. In particular, the volume of the first compartment 31 amounts to approx. 70 to 80% of the overall volume of the windshield airbag 3. Accordingly, the second compartment 32 only has a volume of 30 to 20% of the overall volume of the windshield airbag 3.

Figure 2:
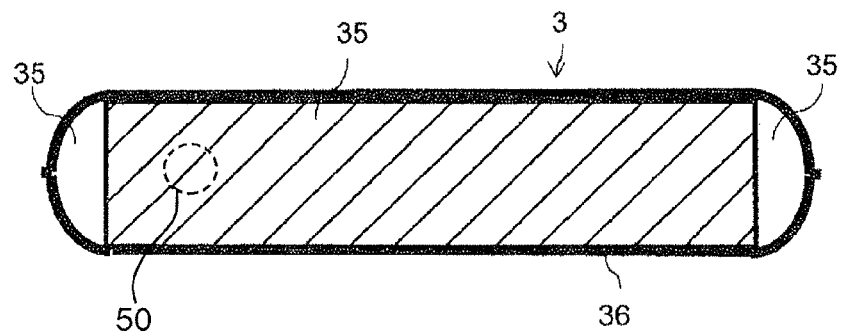
FIG. 2 is a schematic sectional view of a windshield airbag transversely to a windshield according to the embodiment of the invention.

FIG. 2 shows a sectional view in the direction of the arrows A-A in FIG. 3 through the windshield airbag 3 along a transverse direction relative to the windshield 5 and perpendicularly to the windshield 5. It can be seen here that the partition 35 is firmly connected to the airbag sleeve 36 at the top and the bottom, e.g. sewn or bonded therewith, whereas the partition 35 is, at its left-hand end and its right-hand end, not connected to the airbag sleeve 36. In particular, as a result of this a gas-permeable gap is formed to the left and to the right of the partition 35 between the airbag sleeve 36 and the partition 35. The left-hand and the right-hand gap form a left-hand fluid connection 33 and a right-hand fluid connection 34, through which the gas can flow from the first compartment 31 into the second compartment 32 and vice versa.

Alternatively, the fluid connection may of course also be a passage formed in the partition 35 (passage 50 (shown schematically in dashed-lines in FIG. 2), and more fluid connections or fewer fluid connections may be formed in suitable places between the first compartment and the second compartment. Further, the fluid connection may, with regard to a desired gas flow both from the first into the second compartment and from the second into the first compartment, be dimensioned in a suitable manner and/or be provided with flow-limiting structures and devices.

A function of the safety device 1 will be described below.

In the case of a collision or an imminent collision of the motor vehicle with a person being detected, e.g. with a pedestrian or a cyclist, the controller 13 generates an activation signal that activates the gas generator 7. As a result, gas is released from the gas generator 7 and is blown directly into the first compartment 31. In the course of this, the airbag 3 is initially deployed via the first compartment 31 over the entire width of the windshield, until the inflowing gas enters into the second compartment 32 via fluid connections 33 and 34.

In this context it is noted that the first compartment 31 is designed to be larger than the second compartment 32 in particular to ensure that the gas is initially blown into the first compartment 31, so that a faster pressure increase in the first compartment 31 may occur. The pressure increase will be slightly smaller if the first compartment 31 is larger. This means that over the course of time, the first compartment 31 will therefore be completely inflated and, in the meantime, gas already flows continuously over into the second compartment 32, until the second compartment 32 is also completely inflated. Thus, the first compartment 31 is inflated at an earlier point-in-time than the second compartment 32.

The influencing criteria during a collision with the pedestrian are, in particular, the vehicle speed and the size of the person who is in a frontal collision with the motor vehicle. In this connection it could be determined that a tall person hits the windshield at a higher point than a short person. Further, the point of impact is also a function of the speed. In the case of a high speed, the respective person tends to impact at a higher point than in the case of a low speed. Typical speeds, at which a windshield airbag can achieve its protective effect, are in a range of 20 km/h up to approximately 50 km/h. Further, the size of the person and the speed of the motor vehicle influence the point-in-time at which the person hits the windshield airbag 3. There is a tendency for a shorter person to more likely hit at a lower region, whereas a taller person is more likely to hit at an upper region. In this respect, the first compartment 31 is located such that it is preferably hit by a shorter person, and the second compartment 32 is located such that it is preferably hit by a taller person. Since a shorter person hits at a lower point and therefore flies less far, the point/period in time of impact of a shorter person will be earlier than the point/period in time of impact of a taller person.

The inventors have found that it is advantageous to inflate the first compartment 31 earlier than the second compartment 32. This is achieved by way of providing that the gas generator 7 blows the gas only into the first compartment 31 and that the gas can only then flow over at lateral ends of the windshield airbag 3 into the second compartment 32. This means that the first compartment 31, is inflated earlier than the second compartment 32. Thus, the activation of the gas generator can be carried out at a later point-in-time, because in the case of an impact of a shorter person at an earlier point-in-time, not the entire airbag 3, but only the first compartment 31 needs to be inflated.

If now a collision takes place with a short person, although the system does not necessarily have to detect whether this is a short or a tall person, a short person will hit against a lower region of the airbag 3, namely the first compartment 31, at a comparatively early point-in-time. Since a short person hits at a comparatively early point-in-time, but the first compartment 31 is already completely inflated, the windshield airbag 3 can already develop its full protective effect for the short person at the early point-in-time, because the first compartment 31 is already at full pressure. However, if a short person hits against the first compartment 31, the second compartment 32 is not yet completely filled. Thus, in the case of an impact with a short person, the concomitant increase in pressure can be reduced via the fluid connections 33 and 34. In other words, the first compartment 31 is vented into the second compartment 32 via the fluid connections 33, 34. In this way, an undesired rebound effect on the person is avoided.

However, if the collision is a collision with a tall person, then this tall person will hit the windshield airbag 3 at a comparatively late point-in-time and at a higher point. At the comparatively late point-in-time, the first compartment 31 and also the second compartment 32 are already completely inflated. Thus, the windshield airbag 3 can develop its protective effect also in an upper area of the windshield airbag 3. In order to avoid, at the late point-in-time, an undesired rebound effect of the windshield airbag 3 that is now completely inflated, the windshield airbag 3 is now vented. This is carried out via the controlled gas outlet valve 9, which means, when a tall person hits the second compartment 32, gas can flow from the second compartment back into the first compartment via the fluid connections 33 and 34 and through the then open gas outlet valve 9. Further, the gas can escape from the first compartment 31 into the environment. At a late point-in-time, assuming that the protective effect of the airbag 3 is no longer required, the gas outlet valve 11 is opened for a rapid and complete emptying of the airbag. To this end, the gas outlet valve 11 is dimensioned to be larger than the gas outlet valve 9. After a complete venting of the airbag 3, the latter can be pulled out of the field of view of the driver of the motor vehicle by a return unit (not shown).

Thus, the safety device can develop its protective effect in a suitable manner in the case of people of different sizes, both for short persons and for tall persons, in different speed ranges, without it being necessary for the safety device to know whether a short person or a tall person is hitting the motor vehicle.

Altogether, the solution according to the invention allows a later activation of the safety device 1, in particular of the gas generator 7, with the advantages described above.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A safety device for a motor vehicle, comprising:
an inflatable airbag configured to extend over at least a bottom portion of an outer side of a windshield of the motor vehicle in an inflated condition in order to protect a person colliding with the motor vehicle; and
a gas generator configured to inflate the airbag in an event of a collision with the person, wherein
the airbag comprises first and second compartments,
the first compartment is located adjacent to a bottom end of the windshield in the inflated condition,
the second compartment is located away from the bottom end of the windshield in an upward and rearward direction of the motor vehicle in the inflated condition,
each of the first and second compartments extends over an entire width of the windshield in a transverse direction of the motor vehicle, and
the first and second compartments are configured such that during the inflating of the airbag the first compartment is completely filled at an earlier point-in-time than the second compartment.

2. The safety device according to claim 1, further comprising a fluid connection formed between the first compartment and the second compartment.

3. The safety device according to claim 2, wherein
the safety device is designed such that the first compartment is completely filled at a determined first point-in-time at which a person that has a defined first height and collides with the motor vehicle would hit the airbag, and
the safety device is designed such that the second compartment is completely filled via the fluid connection at a determined second point-in-time at which a person that has a defined second height would hit the airbag after the first point-in-time, the first height being less than the second height.

4. The safety device according to claim 3, wherein
upon impact with the first compartment, gas present in the first compartment escapes into the second compartment via the fluid connection.

5. The safety device according to claim 4, wherein
upon impact with the second compartment, gas present in the second compartment escapes into the first compartment via the fluid connection, and gas from the first compartment escapes into an outer environment of the motor vehicle.

6. The safety device according to claim 3, wherein the second compartment is emptyable exclusively via the fluid connection and/or finable exclusively via the fluid connection.

7. The safety device according to claim 2, wherein the gas generator connects only to the first compartment in order to blow gas directly into the first compartment during the inflating of the airbag.

8. The safety device according to claim 2, wherein a partition is arranged to separate the first compartment and the second compartment of the airbag.

9. The safety device according to claim 8, wherein a fluid connection between the first compartment and the second compartment is arranged in an edge region of the partition between the edge region of the partition and an airbag sleeve of the airbag.

10. The safety device according to claim 8, where a fluid connection between the first and second compartments is arranged in the partition.

11. The safety device according to claim 2, further comprising:
a first gas outlet of the first compartment for discharging gas from the airbag into an outer environment of the vehicle, the first gas outlet comprising a first controllable gas outlet valve; and
a second gas outlet of the first compartment for discharging gas from the airbag into the environment, the second gas outlet comprising a second controllable gas outlet valve.

12. The safety device according to claim 11, wherein the first and second gas outlet valves are configured such that a larger amount of gas is flowable through the second gas outlet valve than through the first gas outlet valve.

13. The safety device according to claim 11, further comprising a controller operatively configured to open the second controllable gas outlet valve after the inflating of the airbag and after the opening of the first controllable gas outlet valve.

14. The safety device according to claim 11, further comprising a controller operatively configured to open the first controllable gas outlet valve and the second controllable outlet valve at a same time.

15. The safety device according to claim 1, wherein
the first compartment is arranged directly adjacent the windshield in the inflated condition, and/or
the second component is arranged directly adjacent the windshield in the inflated condition.

16. The safety device according to claim 1, wherein a maximum volume of the first compartment is larger than a maximum value of the second compartment.

17. The safety device according to claim 16, wherein a ratio between the maximum volume of the first compartment and the maximum volume of the second compartment is in a range of 65:35 to 85:15.

18. A safety device for a motor vehicle, comprising:
an inflatable airbag configured to extend over at least a bottom portion of an outer side of a windshield of the motor vehicle in an inflated condition in order to protect a person colliding with the motor vehicle; and
a gas generator configured to inflate the airbag in an event of a collision with the person, wherein
the airbag comprises first and second compartments, each extending across an entire width of the windshield,
the first compartment and the second compartment are arranged such that a person having a defined first height and colliding with the motor vehicle would impact the first compartment and a person having a defined second height colliding with the motor vehicle would impact the second compartment, the first height being less than the second height, and
the first and second compartments are configured such that during the inflating of the airbag the first compartment is completely filled at an earlier point-in-time than the second compartment.

19. The safety device according to claim 18, wherein
the safety device is designed such that the first compartment is completely filled at a determined first point-in-time at which the person that has the defined first height and collides with the motor vehicle would hit the airbag, and
the safety device is designed such that the second compartment is completely filled via the fluid connection at a determined second point-in-time at which the person that has the defined second height would hit the airbag after the first point-in-time.

20. The safety device according to claim 19, wherein upon impact with the first compartment, gas present in the first compartment escapes into the second compartment via the fluid connection.

* * * * *